Oct. 18, 1932.                    M. KING                        1,883,798
                          CAMERA FRAME ELEVATOR
                            Filed Dec. 7, 1931
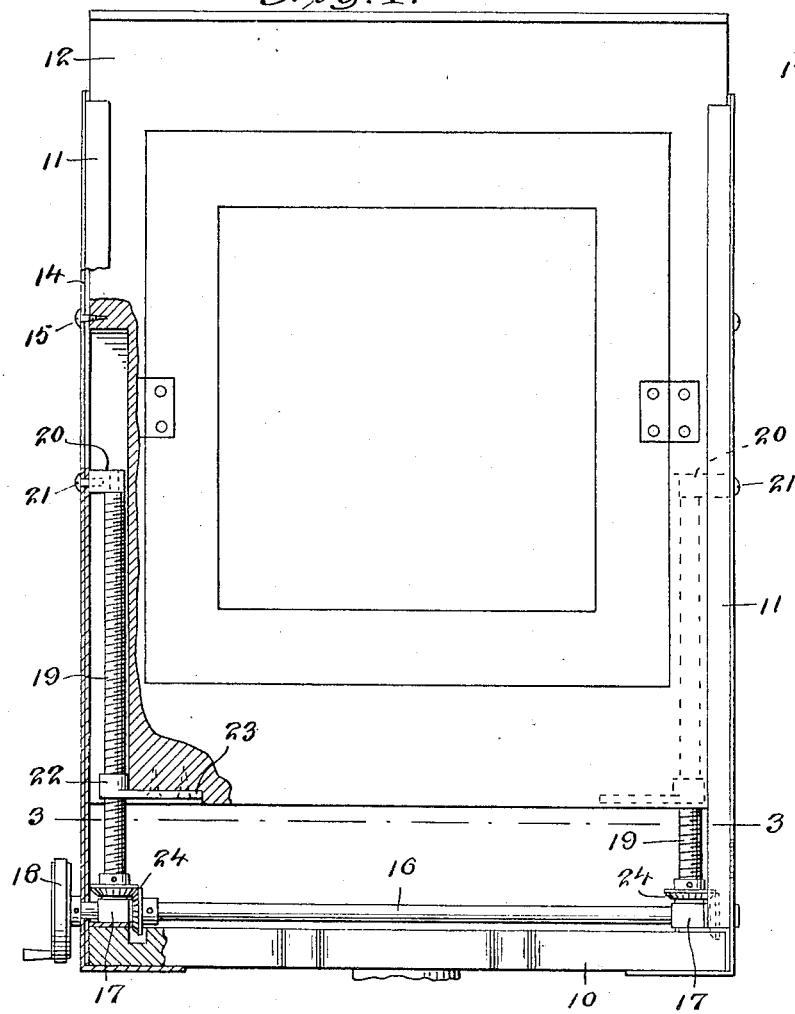
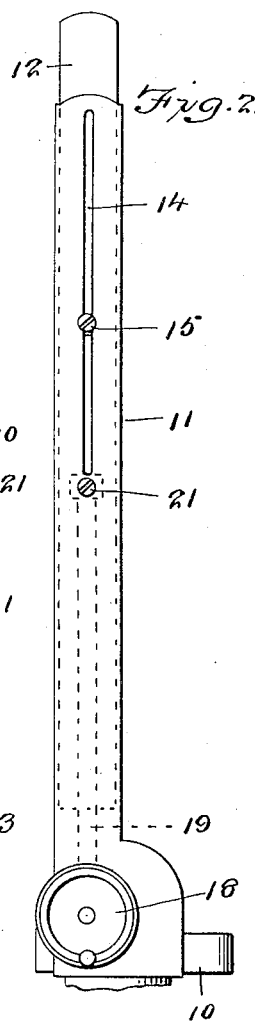
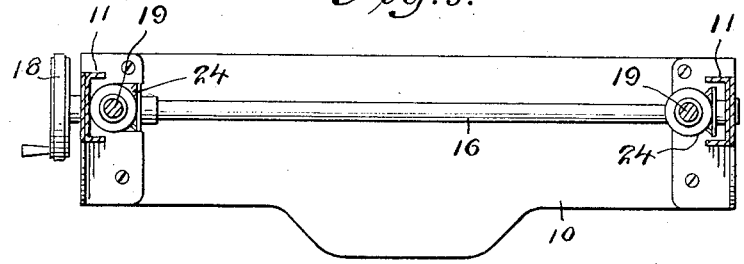
Melbert King
INVENTOR
BY Victor J. Evans & Co.
ATTORNEY Patented Oct. 18, 1932

1,883,798

UNITED STATES PATENT OFFICE

MELBERT KING, OF ALTOONA, PENNSYLVANIA

CAMERA FRAME ELEVATOR

Application filed December 7, 1931. Serial No. 579,600.

The object of the invention is to provide a camera construction in which the yoke is equipped with means for elevating and lowering the frame without any opportunity of the latter binding and therefore springing the yoke in such a way that effective adjustment of the frame could not be obtained; and to provide a device of the kind indicated which is of simple form, of durable construction and yet of a character that may be cheaply manufactured.

With this object in view, the invention consists in a construction and combination of parts of which a preferred embodiment is illustrated in the accompanying drawing. Continued use in practice, however, may dictate certain changes or alterations and the right is claimed to make any which fall within the scope of the appended claim.

In the drawing:

Figure 1 is an elevational view of a camera frame yoke and its attendant frame, this figure being partly broken away to disclose the adjusting means constituting the invention.

Figure 2 is an edge elevational view of the structure of Figure 1.

Figure 3 is a sectional view on the plane indicated by the line 3—3 of Figure 1.

The yoke 10 is provided with the upright cross-sectionally channel-shaped guides 11 in which is slidably mounted the frame 12, so that the latter may be adjusted vertically in the yoke. The web portions of the uprights are slotted as indicated at 14 and these slots are traversed by screws 15 threadingly engaged with the frame 12.

Disposed transversely of the yoke just above the foot portion thereof is a shaft 16, journaled in bearings 17 and extending beyond one of the uprights 11 to receive the hand wheel 19 by which rotary movement may be imparted to the shaft 16. The shaft 16 is operatively connected with the elevating screws 19 which are uprightly disposed at opposite sides of the yoke within the uprights 12, the lower ends of the screws being journaled in the bearings 17 and the upper ends being journaled in the bearings 20 which are secured by means of screws 21 to the web portions of the uprights. Frame 12 is slotted on opposite sides to provide clearance spaces for the elevating screws and the latter pass through nuts 22 seated in the frame and secured in position therein by means of the extensions 23 with which they are formed.

The operative connections between the shaft 16 and elevating screws consist of miter gear couples 24.

Obviously, the rotation of the shaft 16 will, by reason of the double gear connections 24, impart rotary or turning movement to the screws 19 and these being turned angularly in synchronism, the frame is elevated or lowered uniformly on both sides of the yoke, so that there is no chance of its binding in the upright guides of the latter. The construction also provides for effectively maintaining any desired adjustment of the frame, because any position to which the frame is brought can not be disturbed except by rotation of the hand wheel 18. That is, any force applied to the frame would not tend to disarrange it in its position, since the screws could not be rotated by any tendency to move the nuts 22 axially of them.

The invention having been described, what is claimed as new and useful is:

In combination with a camera frame and yoke, the latter being provided with upright guides in which the former is slidably mounted, vertical elevating screws disposed adjacent the legs of the yoke and journalled in blocks mounted on the bottom of the yoke and other blocks secured to the legs of the yoke, the frame being slotted on opposite sides and the screws being disposed in said slots, nuts threadingly engaging the screws and formed with extensions having fasteners securing them to the under edge of the frame in slots formed in said under edge, a transverse shaft spanning the yoke and journalled in the lower of the blocks in which the screws are journalled at their lower ends, miter gear connections between said shaft and said screws, and an actuating handle for imparting rotary or turning movement to said shaft.

In testimony whereof I affix my signature.

MELBERT KING.